UNITED STATES PATENT OFFICE.

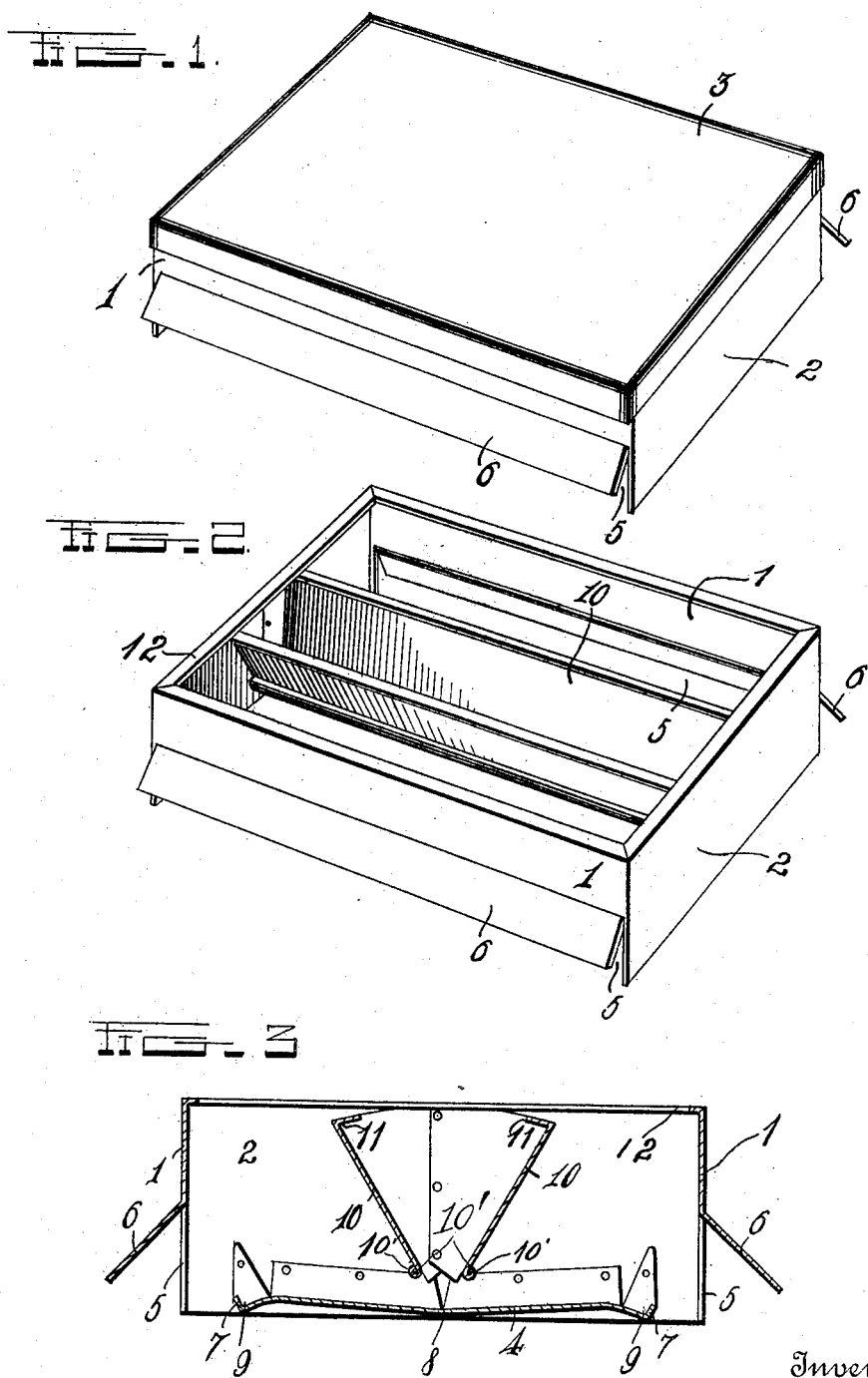

SAMUEL A. VANCIL, OF GREENWAY, ARKANSAS.

FEED-BOX FOR POULTRY.

980,367. Specification of Letters Patent. Patented Jan. 3, 1911.

Application filed November 9, 1909. Serial No. 526,983.

*To all whom it may concern:*

Be it known that I, SAMUEL A. VANCIL, a citizen of the United States, residing at Greenway, in the county of Clay and State of Arkansas, have invented certain new and useful Improvements in Feed-Boxes for Poultry; and I do declare the following to be a full, clear, and exact description of the invention, such as will enable others skilled in the art to which it appertains to make and use the same.

This invention relates to improvements in feed boxes for poultry.

One object of the invention is to provide a feed box of this character having means to prevent large fowls from feeding therefrom, but which will permit small chicks to readily enter and feed.

Another object is to provide a feed box in which the feed will be covered and protected and which will prevent the feed from being scattered out and wasted or soiled by the chickens.

With the foregoing and other objects in view, the invention consists of certain novel features of construction, combination and arrangement of parts, as will be more fully described and particularly pointed out in the appended claim.

In the accompanying drawings,—Figure 1 is a perspective view of my improved feed box showing the same in closed position; Fig. 2 is a similar view showing the box open or the cover removed; Fig. 3 is a vertical cross sectional view through the box.

My improved feed box comprises sides 1, ends 2, a removable top 3 and a bottom 4 extending part way across the lower portion of the box as shown. The box may be formed of any suitable material, but is preferably constructed of galvanized sheet metal and the side pieces at the opposite corners of the box are cut upwardly for a suitable distance and said cut portions are bent outwardly and upwardly to form passages 5 through which small chicks may enter the box and reach the feed contained therein. The upwardly bent lower portions of the sides of the box form eaves 6 which protect the passages and prevent rain from entering the box. The bottom 4, of the box has its side edges terminating a short distance from the opposite sides of the box and said edges of the bottom are bent upwardly to form food retaining flanges 7 which prevent the food from falling off the sides of the bottom. The bottom is formed along its central portion with a depression or hollow 8 and adjacent to its side edges is bent upwardly, thus forming between the upwardly bent portions and the flanges 7 gutters 9 which will catch and retain any feed scattered across the bottom.

Secured at its opposite ends to the inside of the ends of the box is a hopper 10, said hopper being V-shaped in cross section and having at its smaller end a discharge opening of sufficient width to permit the food to readily fall therefrom and to the depressed portion of the bottom 4. The lower edges of the sides of the hopper along the opening therein are bent back or folded upon themselves as at 10' to form a round edge which is provided to protect the heads of the chicks from injury which might occur from the unprotected edges of the feed opening at the bottom of the hopper. The plates 10 are provided with inwardly projecting flanges 11 which prevent the feed from being caused to flow over the top of the hopper by any sudden lateral blows or shocks, and also offer an effectual resistance against buckling. Furthermore, the presence of these flanges overcomes any liability of a person cutting his fingers on the edges of the plates when filling the hopper. The flanges 12 on the side and end walls of the box also prevent buckling of the walls and cutting of the attendant while furnishing a firm support for the cover.

When it is desired to place food in the box, the cover or top 3 is removed and the food placed in the hopper after which the cover is again placed on the box, thus protecting the feed therein and preventing the larger fowls from reaching the same. The feed when thus placed in the hopper will readily fall from the discharge in the lower end thereof and onto the bottom of the box where it may be readily reached by chickens small enough to pass through the passages 5 in the sides of the box. A feed box constructed as herein shown and described will also protect the small chickens from rain or snow while feeding.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of this invention as defined in the appended claim.

Having thus described my invention what I claim is:—

The hereindescribed feed box comprising side and end walls, the lower edges of said side walls being bent outwardly and upwardly to form angularly disposed protecting eaves and to provide entrance and exit openings, a bottom plate arranged between the ends of the box and secured thereto at its edges, the side edges of said bottom plate being disposed in spaced parallel relation to the sides of the box, said plate having its body portion inclined inwardly and downwardly in opposite directions to the center of the box, said plate being downwardly inclined adjacent to its longitudinal edges and having flanges formed on said edges extending upwardly at right angles to the inclined portions, flanges formed on the upper edges of the side and end walls, and inclined hopper plates having flanges formed on their upper ends disposed beneath the flanges on the box, said hopper plates extending between the end walls of the box and having their lower edges spaced from the central portion of the bottom plate.

In testimony whereof I have hereunto set my hand in presence of two subscribing witnesses.

SAMUEL A. VANCIL.

Witnesses:
S. T. WHEELER,
A. M. HUGHES.